(12) United States Patent
Marland et al.

(10) Patent No.: US 10,240,437 B2
(45) Date of Patent: *Mar. 26, 2019

(54) VISUALIZATION OF WELLBORE CLEANING PERFORMANCE

(71) Applicant: Halliburton Energy Services, Inc., Houston, TX (US)

(72) Inventors: Christopher Neil Marland, Spring, TX (US); John Wilkes, Glasgow (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,378

(22) Filed: Apr. 17, 2018

(65) Prior Publication Data

US 2018/0232919 A1  Aug. 16, 2018

Related U.S. Application Data

(63) Continuation of application No. 15/542,049, filed as application No. PCT/US2015/067481 on Dec. 22, 2015, now Pat. No. 9,947,120.

(Continued)

(51) Int. Cl.
*E21B 41/00* (2006.01)
*E21B 37/00* (2006.01)
(Continued)

(52) U.S. Cl.
CPC .......... *E21B 41/0092* (2013.01); *E21B 37/00* (2013.01); *E21B 41/00* (2013.01); *E21B 47/00* (2013.01); *E21B 21/08* (2013.01); *E21B 44/02* (2013.01); *E21B 47/12* (2013.01); *G06T 2210/61* (2013.01)

(58) Field of Classification Search
CPC .. G06T 11/206; G06F 17/30716; G06F 19/26; E21B 44/00
See application file for complete search history.

(56) References Cited

U.S. PATENT DOCUMENTS

2012/0330502 A1* 12/2012 Greene .................... B60T 7/18
701/33.9
2013/0127900 A1* 5/2013 Pena ...................... G09G 5/003
345/619

(Continued)

*Primary Examiner* — Phi Hoang
(74) *Attorney, Agent, or Firm* — Chamberlain Hrdlicka

(57) ABSTRACT

A method of performing a drilling operation with a drill bit through a formation. The method including defining optimal settings of drilling parameters for cleaning of a wellbore formed by the drill bit, displaying a graphical indication of the optimal settings of the drilling parameters, determining a maximum rate of penetration of the drill bit based on the optimal settings, displaying, an optimal boundary depicting the maximum rate of penetration, wherein the optimal boundary graphically matches the graphical indication of the optimal settings, displaying, on the visualization tool, an actual boundary depicting an actual rate of penetration of the drill bit, sending a signal to adjust the actual rate of penetration to match the maximum rate of penetration, receiving the signal downhole at a bottom hole assembly, and adjusting the actual rate of penetration of the drill bit using the bottom hole assembly based on the signal.

19 Claims, 4 Drawing Sheets

Related U.S. Application Data

(60) Provisional application No. 62/115,045, filed on Feb. 11, 2015.

(51) Int. Cl.
*E21B 47/00* (2012.01)
*E21B 21/08* (2006.01)
*E21B 44/02* (2006.01)
*E21B 47/12* (2012.01)

(56) References Cited

U.S. PATENT DOCUMENTS

| | | | | |
|---|---|---|---|---|
| 2014/0060931 | A1* | 3/2014 | Pettapiece | E21B 44/00 175/27 |
| 2014/0075359 | A1* | 3/2014 | Raja | E21B 44/00 715/771 |
| 2015/0129306 | A1* | 5/2015 | Coffman | E21B 49/003 175/25 |
| 2015/0252664 | A1* | 9/2015 | Astrid | E21B 44/04 700/275 |
| 2015/0345262 | A1* | 12/2015 | Kpetehoto | E21B 44/02 175/27 |
| 2016/0053603 | A1* | 2/2016 | Israel | E21B 44/00 702/6 |
| 2016/0356144 | A1* | 12/2016 | Toti | G05B 13/04 |

* cited by examiner

VISUALIZATION OF WELLBORE CLEANING PERFORMANCE

BACKGROUND

This section is intended to introduce the reader to various aspects of the art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

During well drilling operations, gravity can cause deposits of drill cuttings to build up along the bottom surface, the sidewalls and/or the annulus of a wellbore. Often, the buildup of such deposits can lead to friction inside of the wellbore and malfunctioning of a drillstring or other downhole machinery located within the wellbore. Wellbore or hole-cleaning techniques may be implemented to remove the drilling cuttings and any types of debris from the wellbore, including debris adhering to the inside of a well casing. The wellbore cleaning techniques can also remove and recover drilling mud, limit wellbore formation damage and prepare the well for equipment installation, among other actions.

A variety of methods to optimize performance of wellbore cleaning, or the drill rate performance, may be implemented during drilling operations. In some cases, different drilling parameters may be adjusted, such as the rotational speed, the fluid flow rate, and the fluid properties, to ensure substantial wellbore cleaning. The rate of penetration (ROP) may also be adjusted, for instance, by increasing or decreasing the ROP to achieve a ROP indicative of optimized wellbore cleaning. Typically, the level of performance for the wellbore cleaning is based on the degree of change in the rate of ROP (i.e., the change between the original ROP and the adjusted ROP), which is manually or iteratively determined. However, inadequate wellbore cleaning due to inaccurate determinations of the degree of change can lead to various drilling complications including formation fracturing, difficulties in logging and cementing, and excessive torque and drag on drilling equipment, among other issues.

BRIEF DESCRIPTION OF THE DRAWINGS

For a detailed description of the embodiments of the invention, reference will now be made to the accompanying drawings in which.

DETAILED DESCRIPTION

Figure 1:
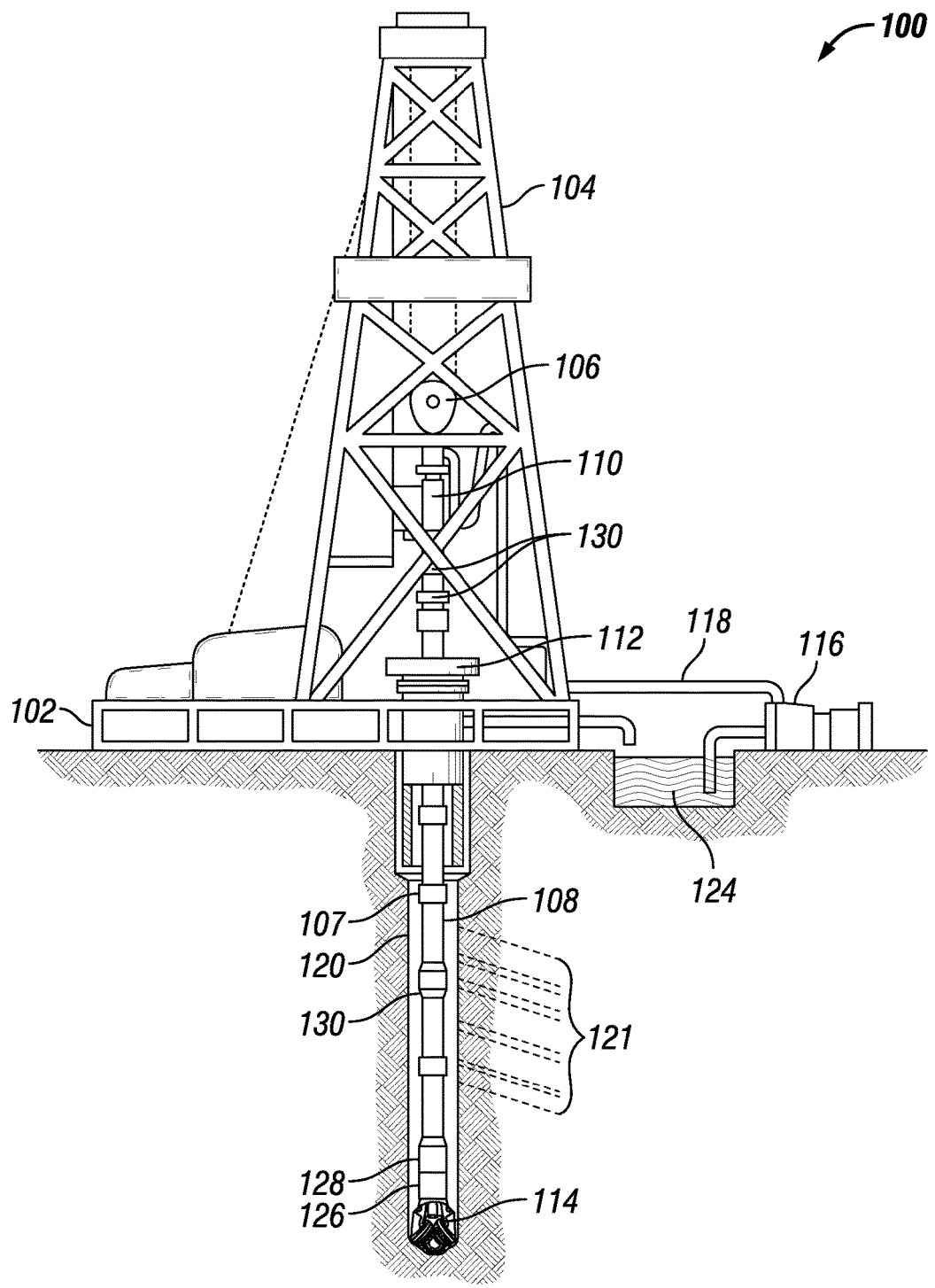
FIG. 1 depicts an example oilfield environment, according to one or more embodiments.

FIG. 1 depicts an example oilfield environment 100, according to one or more embodiments. As shown, a drilling platform 102 is equipped with a derrick 104 that supports a hoist 106 for raising and lowering a drill string 108. The hoist 106 suspends a top drive 110 that rotates the drill string 108 as the drill string is lowered through the well head 112. Sections of the drill string 108 are connected by threaded connectors 107. Connected to the lower end of the drill string 108 is a drill bit 114. As the drill bit 114 rotates, a wellbore 120 is created that passes through various formations 121 within a reservoir. A pump 116 circulates drilling mud through a supply pipe 118 to top drive 110, through the interior of drill string 108, through orifices in drill bit 114, back to the surface via the annulus around drill string 108, and into a retention pit 124. The drilling mud transports cuttings from the wellbore 120 into the pit 124 and aids in maintaining the integrity of the wellbore 120.

As the bit 114 forms the wellbore 120, remnants of drilling mud or other debris lingering in the wellbore 120 may lead to downhole equipment failure or plugging of the formations 121. Wellbore cleaning services can be implemented before or after the start of production, to remove drilling mud or other debris to increase nonproductive time (NPT) and operating costs, among other issues. A tool 126 may be integrated into a bottom-hole assembly (BHA) near the bit 114. The BHA is the lowest part of the drill string 108 and can consist of the threaded connectors 107, the drill bit 114, among other components not shown. The tool 126 may take the form of a drill collar, i.e., a thick-walled tubular that provides weight and rigidity to aid the drilling process and may include one or more components known to those of skill in the art. For example, the tool may 126 include one or more sensors or visualization tools, among many other components. In one or more other embodiments, the tool may be take other forms or may be located along various locations of the drill string 108.

As the bit 114 extends the wellbore 120 through the formation(s) 121, the tool 126 may collect data related to determining whether effective cleaning of the wellbore 120 has occurred. In one or more embodiments, the tool 126 may review one or more drilling parameters to determine the occurrence of optimal wellbore cleaning for a given cutting loads. In particular, the tool 126 may support a technique for visualizing the wellbore 120 cleaning performance at a given time.

In one or more embodiments, the tool 126 may be coupled to a telemetry module 128 having a transmitter that transmits signals in a wall of drill string 108. One or more receivers 130 may be coupled to tubing below the top drive 110 and along the drill string 108 to receive the transmitted signals related to the wellbore 120 cleaning performance. The tool 126 may be designed to identify whether the cleaning of the wellbore 120 has occurred at suboptimal conditions by monitoring and transmitting signals that can be converted to display poor drilling parameters or improvement recommendations for drilling performance, among other factors.

Figure 2:
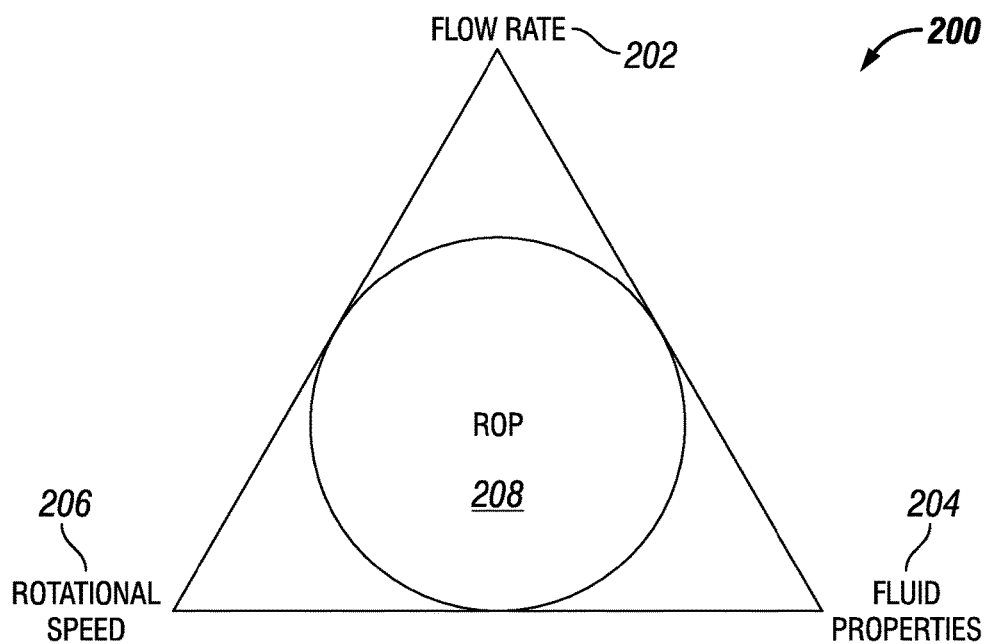
FIG. 2 depicts an example of a visualization tool, according to one or more embodiments.

Referring now to FIG. 2, an example of a visualization tool 200 used during wellbore cleaning, according to one or more embodiments, is shown. The rate of penetration (ROP) refers to a drilling speed capable of penetrating a formation or a wellbore. To maintain an optimal ROP, the wellbore is often cleaned to remove excess cuttings or other debris formed during drilling operations. Effective wellbore cleaning may be defined by a set of drilling parameters 202, 204, and 206 for a given wellbore trajectory and for an optimal ROP, i.e., maximum ROP for effective wellbore cleaning based on the drilling parameters. In the event of a non-optimal ROP, the visualization tool 200 can identify suboptimal drilling parameters 202, 204, and 206 that contribute to the less than optimal cleaning performance or opportunities for improvements in the cleaning performance. In one or more embodiments, the drilling parameters 202, 204, and 206 may define the visualization tool 200, which displays the level of performance for the wellbore cleaning.

The drilling parameters include flow rates 202, fluid properties 204 and rotational speeds 206. An appropriate flow rate 202 ensures that an annular fluid velocity exceeds the slip velocity of cuttings formed in the wellbore. The fluid properties 204 include fluid density, mud weight, plastic viscosity, yield point and other rheological properties described by the standard Fann viscometer readings measured at 600, 200, 200, 100, 6 and 3 revolutions per minute (rpm). The rotational speed 206 includes the speed at which components of a drilling system, including a drillstring and bottom-hole assembly (BHA), rotate around the annulus of the wellbore in order to cause drilled cuttings to be suspended in a fluid flow path.

As shown in FIG. 2, the visualization tool 200 is represented by a triangle. In accordance with one or more embodiments, the visualization tool 200 can include any type of graphical indicator capable of graphics display, including geometric shapes, numerical values, graphs, and so forth, regardless of size, shape, color, among other properties. Each point of the visualization tool 200 represents one of the three drilling parameters 202, 204, and 206 so as to indicate the progression of a wellbore cleaning during a period of time.

Based on factors such as the wellbore construction, BHA design, borehole sizes, and well inclination, the drilling parameters 202, 204, and 206 define the optimal ROP 208. As shown in FIG. 2, the optimal ROP 208 represents the most favorable drilling conditions, for example, effective reduction or elimination of solids in the wellbore, optimization of the well location and trajectory and reduction in the risk of wellbore instability. The visualization tool 200 includes graphical "boundaries" defined by the drilling parameters 202, 204, and 206 and the optimal ROP 208 may represent achieving efficient and satisfactory wellbore cleaning by reaching those boundaries to the maximum extent given the drilling conditions.

As will be further explained, an actual ROP (i.e., an ROP occurring in real-time) that falls outside of the boundaries of the visualization tool 200 represents one or more suboptimal drilling parameters 202, 204, and 206 with respect to wellbore cleaning. An actual ROP that retreats inward from the boundaries of the visualization tool 200 represents the potential to improve the actual ROP. In accordance with one or more embodiments, the visualization tool 200 may include visual warnings, auditory warnings, or any other type warning signals to warn a user if the actual ROP exceeds one or more of the boundaries, or, under performs by failing to reach one or more the boundaries.

In one or more embodiments, the drilling parameters 202, 204, and 206 and thus, the visualization tool 200, can be calculated or defined from hydraulics modeling using rheology modeling or any other suitable modeling system. Further, the drilling parameters 202, 204, and 206 and the visualization tool 200 can be updated in real-time using real-time drilling parameters values and mud rheology information, as will be later discussed. One skilled in the art will appreciated that the drilling parameters 202, 204, and 206 and the visualization tool 200 may be defined by various alternative techniques not described in the present embodiments.

Figure 3:
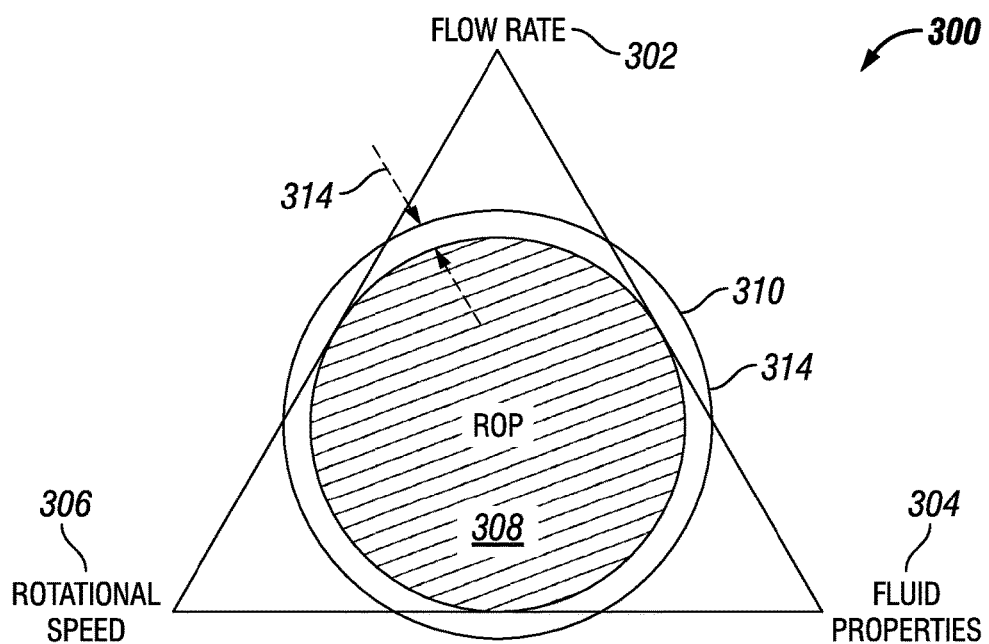
FIG. 3 depicts an example of a visualization tool with compromised parameters, according to one or more embodiments.

FIG. 3 depicts an example illustration of a visualization tool 300 with suboptimal parameters, according to one or more embodiments. Any one drilling parameter 302, 304, and 306 being less than optimal affects an optimal ROP 308 and thus, also decreases the wellbore cleaning capacity of a drilling system.

In one or more embodiments, the visualization tool 300, as viewed on a graphical display, such as a display monitor, can provide a visual depiction of an actual ROP 310 with respect to the optimal ROP 308. Referring to FIG. 3, the visualization tool 300 may indicate one or more comprised drilling parameters 302, 304, and 306 when the actual ROP 310 exceeds the boundaries of the tool 300. For example, an increase in the rotational speed 306 may cause the actual ROP 310 to exceed the optimal ROP 308. In this instance, build-up of drilled cuttings may begin to form inside of the wellbore. If the wellbore includes a hole inclination, such as from vertical to around 30 degrees, the build-up may lead to restrictions and pressure increases. If the wellbore includes a hole inclination above 30 degrees, the cutting may avalanche down the wellbore causing wellbore restrictions and possible BHA damage, among other issues. In other cases, a reduction in cuttings removal and build-up in the wellbore may occur due to changes in the fluid properties 304 and/or a reduction in the flow rate 302 from rig pumps and in the annular fluid velocity in the drilling system.

In accordance with one or more embodiments, the visualization tool 300 may also display an expression related to the difference between the actual ROP 310 and the optimal ROP 308, i.e., $\Delta$ROP 314. In various embodiments, the $\Delta$ROP 314 may be display by percentages, real numbers, or fractions, among other numerical formats. To overcome the compromised drilling parameters 302, 304, and 306 and to improve the wellbore cleaning efficiency, a user may use the $\Delta$ROP 314 to adjust the actual ROP 310. For example, to bring the actual ROP 310 in line with the optimal ROP 308, the actual ROP 310 may be reduced by a value equal to the $\Delta$ROP 314.

In accordance with one or more embodiments, the visualization tool 300 may display additional information as specified by a user, for example, the percentage of hole inclination, the volume of cuttings in the wellbore not removed, or the volume of build-up cuttings along the walls of the wellbore.

Figure 4:
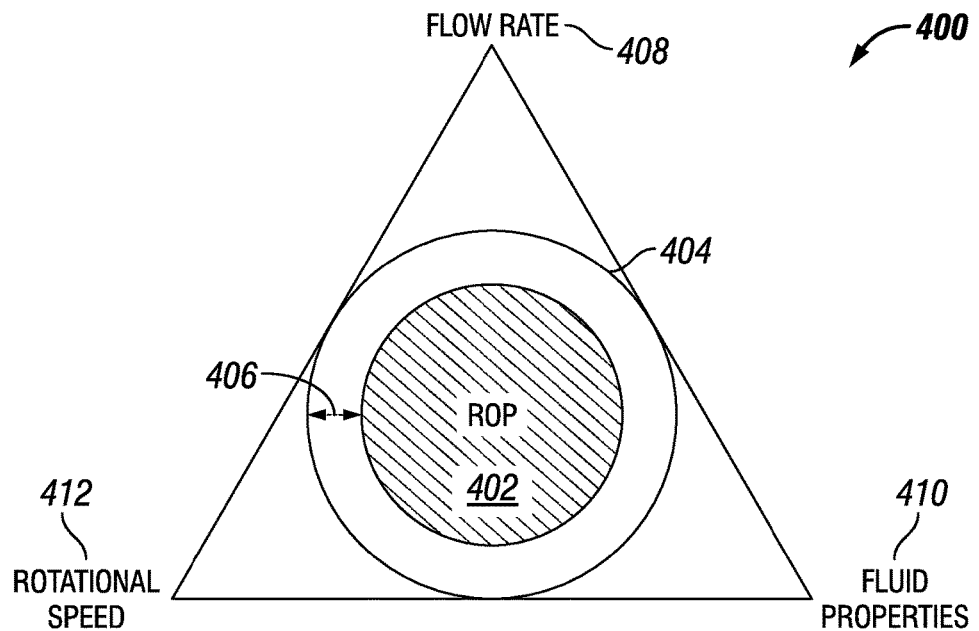
FIG. 4 depicts an example of a visualization tool with optimization potential, according to one or more embodiments.

FIG. 4 depicts an example of a visualization tool 400 with optimization potential, according to one or more embodiments. The visualization tool 400 can display drilling performance improvement opportunities where an actual ROP 402 is suboptimal, or falls below the optimal ROP 404. The actual ROP 402 often decreases with increasing fluid density, viscosity, mud rates, and solid content, among other factors. As shown in FIG. 4, as the ROP decreases (i.e., under performs), the graphical display of the actual ROP 402 retreats inward and away from the boundaries of the visualization tool 400 to form a gap 404 located between the actual 402 and the optimal ROP 404.

In one or more embodiments, the gap 404 represents a degree of available improvement required to align the actual ROP 402 with the optimal ROP 404. The gap 404 will be outwardly reduced as the actual ROP 402 increases, or improves. In examples, the actual ROP 402 can be improved by increasing the weight on a drill bit or increasing the flow rate and the mud flow rate, among other factors. Optimized wellbore cleaning occurs and the drilling parameters 408, 410 and 412 are no longer compromised when the actual ROP 402 reaches the boundaries of the visualization tool 400, or the optimal ROP 404, as illustrated in FIG. 4.

In accordance with one or more embodiments, FIG. 4 depicts one method of visualizing the gap 404 and the actual ROP 402 with relationship to the optimal ROP 404. The gap 404 may be represented by any type of graphical indicator, regardless of size, shape, and color. In accordance with one or more embodiments, the gap 404 may represent a mathematical expression related to the difference between the actual ROP 402 and the optimal ROP 404, for example, ΔROP. Accordingly, the gap 404 may be represented by percentages, real numbers, or fractions, among other numerical formats.

Figure 5:
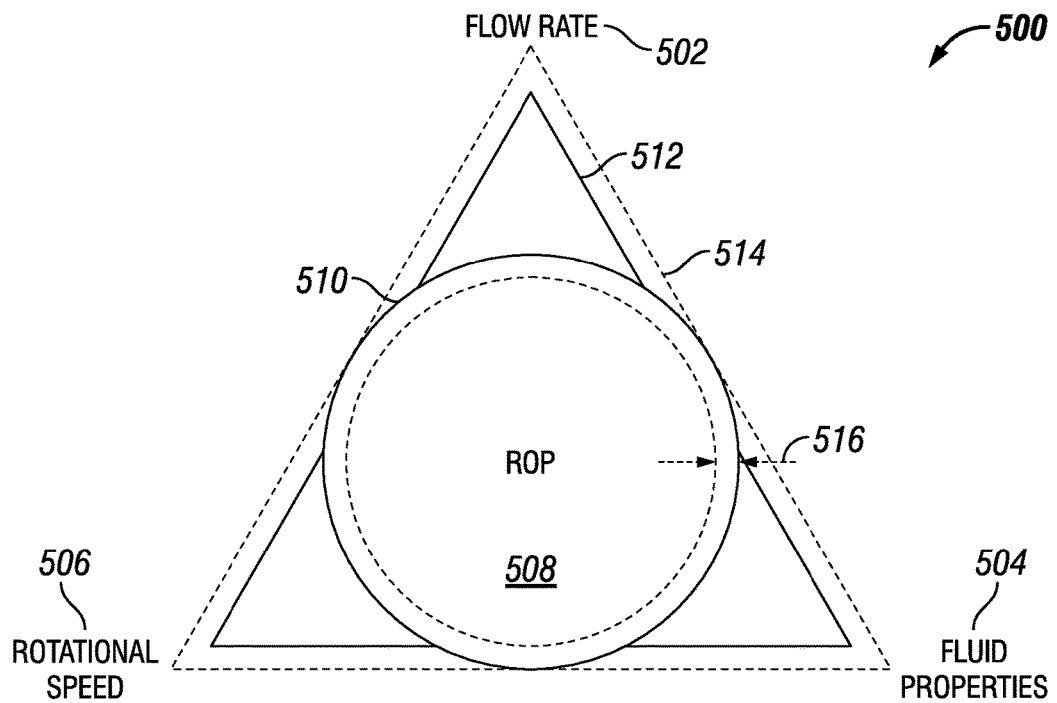
FIG. 5 depicts an example of a visualization tool with user exceptions, according to one or more embodiments.

FIG. 5 depicts an example of a visualization tool 500 with user exceptions, according to one or more embodiments. The original drilling parameters 502, 504, and 506, along with the dimensions of a wellbore, may define an optimal ROP 508. In accordance with one or more embodiments, real-time data may be feed to the visualization tool 500 to update the original drilling parameters 502, 504, and 506, and thus define the optimal ROP 508. For example, real-time data related to the dimensions of a larger than desired wellbore size, such as in the case of a hydraulically washed out borehole, may lower the annular velocity. As a result, the drilling parameters 502, 504, and 506 may be compromised so that an actual ROP 510 exceeds the boundaries of the visualization tool 500. In some cases, however, there are no detrimental effects caused by drilling risks or reductions in wellbore cleaning although the suboptimal drilling parameters 502, 504, and 506 have been accepted.

The acceptance of the suboptimal drilling parameters 502, 504, and 506 may be displayed by multiple boundary conditions with respect to the visualization tool 500. As shown in FIG. 5, the visualization tool 500 includes two boundary conditions including boundary condition 512 and boundary condition 514. Boundary condition 512 defines optimal wellbore cleaning or the optimal ROP 508. Boundary condition 514 defines the maximum deviation accepted, or an exception to wellbore cleaning. The actual ROP 510 (i.e., the ROP accepted with deviation), may be located between boundary condition 512 and boundary condition 514, as illustrated in FIG. 5. In one or more embodiments, an area located between the two boundary conditions 512 and 514 represents a margin of error 516. The margin of error 516 may define a level of confidence that effective wellbore cleaning continues despite compromised drilling parameters and an actual ROP 510 that exceeds the optimal ROP 508.

However, the visualization tool 500 may indicate that the actual ROP 510 is under performing if it falls below the boundary condition 512 and the optimal ROP 508, as shown in FIG. 3. If the actual ROP 510 exceeds the boundary condition 514, the visualization tool 500 may indicate that the actual ROP 510 is exceeding the optimal value. In both cases, the drilling parameters 502, 504, and 506 may be suboptimal and thus suboptimal wellbore cleaning may occur.

Figure 6:
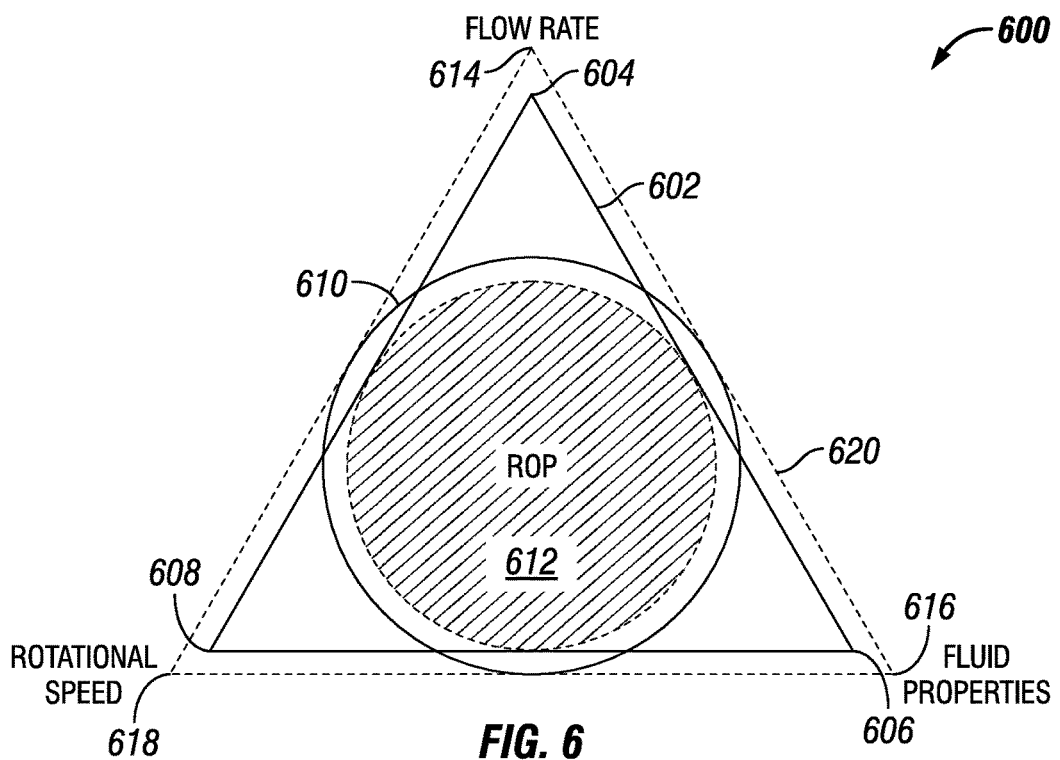
FIG. 6 depicts an example of a visualization tool with recommendations and new boundary conditions, according to one or more embodiments.

FIG. 6 depicts an example of a visualization tool 600 with recommendations and new boundary conditions, according to one or more embodiments. Boundary condition 602 of the visualization tool 600 represents wellbore cleaning at current drilling parameters 604, 606, and 608. In one or more embodiments, data related to drilling limitations that compromises the parameters 604, 606, and 608 may be feed to the visualization tool 600. Consequently, an actual ROP 610 may exceed an optimal ROP 612.

In accordance with one or more embodiments, the visualization tool 600 may highlight and recommend changes in order to improve and/or overcome the drilling limitations. Once implemented, the recommendations may adjust the drilling parameters 604, 606, and 608 to create new drilling parameters 614, 616, and 618. To overcome the drilling limitations, a new boundary condition 620 may be created to compensate for the actual ROP 610 so as to provide optimal wellbore cleaning.

Figure 7:
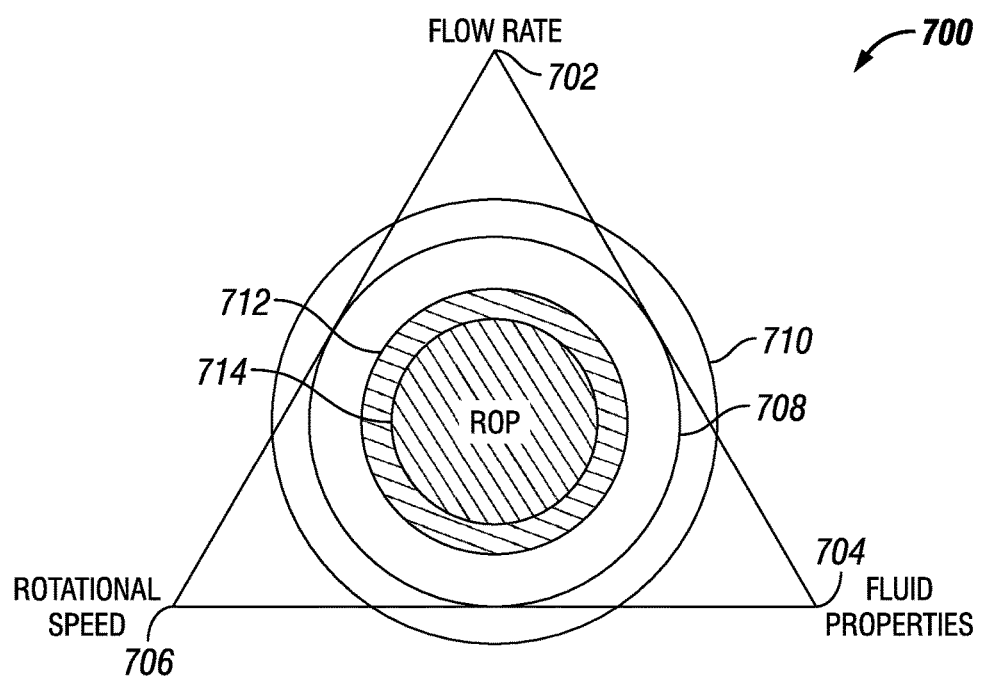
FIG. 7 depicts an example of a visualization tool used as an instructional tool, according to one or more embodiments.

FIG. 7 depicts an example of a visualization tool 700 used as an instructional tool, according to one or more embodiments. In one or more embodiments, the visualization tool 700 may act as an instructional tool for formal training, as instructional manuals, or as a tool in postmortem problem analysis. The visualization tool 700 may explain how drilling parameters 702, 704, and 706 are maintained, improved, or become suboptimal by modification to at least one of the parameters. Referring to FIG. 7, optimal ROP 708 indicates maximum ROP for optimal wellbore cleaning operations. In one or more embodiments, the visualization tool 700 may be used to explain how a reduction in one parameter, such as the fluid properties 704, reduces the available wellbore performance to create a suboptimal actual ROP 710.

Further, ROP 712 represents a rate of penetration subjected to secondary wellbore cleaning techniques. In some implementations, secondary wellbore cleaning techniques may be enacted if one of the parameters is compromised. Such techniques can include, but are not limited to, additional time spent not drilling but circulating the drilling fluid. In some instances, the circulation of the drilling fluid is an attempt to remove cuttings from the wellbore that are not effectively removed during drilling operations. However, non-drilling time is often considered as wasted time and in effect reduces the overall ROP, as shown in FIG. 7, where the ROP 712 falls below the optimal ROP 708 although the secondary cleaning practices are utilized. Accordingly, by displaying the lack of optimal wellbore cleaning using the secondary wellbore cleaning techniques (i.e., ROP 712), the visualization tool 700 may indicate its ability to optimally remove cuttings over the secondary techniques.

Additionally, actual ROP 714 represents a rate of penetration that includes wasted time caused by compromised parameters such as slower tripping speeds. In one or more embodiments, the visualization tool 700 is combined with other additional information, such as the slower tripping speeds, to provide additional teaching or analysis value. The visualization tool 700 may explain that wasted time includes the slower tripping speeds and that such additional time further reduces the overall rate of penetration and increases drilling risks. This tool can be used to explain the impact of these reductions.

In addition, to the embodiments described above, many examples of specific combinations are within the scope of the disclosure, some of which are detailed below:

Example 1

A method for displaying performance of a wellbore drilling operation including wellbore cleaning, comprising: defining drilling parameters for the drilling operation; defining a visualization tool comprising a boundary defined by the drilling parameters, wherein the boundary depicts an optimal rate of penetration (ROP); displaying the visualization tool with the optimal ROP, wherein the optimal ROP defines a maximum ROP for optimal wellbore cleaning based on the drilling parameters; displaying an actual rate of penetration (ROP) with respect to the optimal ROP on the visualization tool; and adjusting the actual ROP to match the optimal ROP.

Example 2

The method of Example 1, wherein the drilling parameters comprise at least one of a drilling fluid flow rate, a fluid property, and a rotational speed.

Example 3

The method of Example 1, wherein the actual ROP defines a level of performance for actual wellbore cleaning.

Example 4

The method of Example 1, wherein adjusting the actual ROP comprises reducing the actual ROP.

Example 5

The method of Example 1, wherein adjusting the actual ROP comprises increasing the actual ROP.

Example 6

The method of Example 1, wherein the visualization tool provides a graphical layout of the optimal ROP, wherein the actual ROP is mapped onto the graphical layout.

Example 7

The method of Example 1, further comprising displaying, via the visualization tool, a volume of cuttings in the wellbore not removed from the wellbore, a volume of cuttings adhering to sidewalls of the wellbore, or both.

Example 8

The method of Example 1, further comprising displaying, via the visualization tool, opportunities for well bore cleaning optimization when the actual ROP under performs the optimal ROP.

Example 9

The method of Example 1, further comprising displaying, via the visualization tool, notification of suboptimal drilling parameters when the actual ROP is greater than the optimal ROP.

Example 10

The method of Example 1, further comprising displaying a warning notification, via the visualization tool, when the actual ROP is different than the optimal ROP.

Example 11

A method for displaying performance of a wellbore drilling operation including wellbore cleaning, comprising: defining drilling parameters for the drilling operation; defining a visualization tool comprising a boundary defined the drilling parameters, wherein the boundary depicts an optimal rate of penetration (ROP); displaying the visualization tool with the optimal ROP, wherein the optimal ROP defines a maximum ROP for optimal wellbore cleaning based on the drilling parameters; displaying the visualization tool with an exceeded optimal rate of penetration (ROP); defining an acceptable ROP, wherein the acceptable ROP comprises an acceptable margin of error located between the optimal ROP and the exceeded optimal ROP; and adjusting an actual ROP, wherein the actual ROP falls outside of the bounds of the margin of error.

Example 12

The method Example of 11, wherein the actual ROP is outside of the margin of error when the actual ROP is above or below the optimal ROP.

Example 13

The method of Example 11, further comprising adjusting the drilling parameters with real-time data to adjust the actual ROP.

Example 14

The method of Example 11, further comprising defining one or more recommendations to optimize the wellbore cleaning, wherein the visualization tool displays the one or more recommendations.

Example 15

The method of Example 11, wherein the visualization tool is an instructional tool.

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment. Further, the illustrated figures included within are only exemplary and are not intended to assert or imply any limitation with regard to the environment, architecture, design, or process in which different embodiments may be implemented.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of performing a drilling operation with a drill bit through a formation, comprising:
    defining settings of drilling parameters, including a fluid flow rate, a fluid property, or a rotational speed, for cleaning of a wellbore formed by the drill bit to the maximum extent;
    displaying, on a visualization tool, a graphical indication of the settings of the drilling parameters;
    determining a maximum rate of penetration of the drill bit based on the settings;
    displaying, on the visualization tool, a boundary depicting the maximum rate of penetration, wherein the boundary graphically matches the graphical indication of the settings;
    displaying, on the visualization tool, an actual boundary depicting an actual rate of penetration of the drill bit; and
    adjusting the actual rate of penetration of the drill bit using a bottom hole assembly to match the maximum rate of penetration.

2. The method of claim 1, comprising displaying, via the visualization tool, notification when the actual rate of penetration is greater than the optimal rate of penetration.

3. The method of claim 1, comprising displaying, via the visualization tool, notification when the actual rate of penetration is less than the optimal rate of penetration.

4. The method of claim 1, wherein the actual rate of penetration defines a level of performance for actual wellbore cleaning.

5. The method of claim 1, wherein adjusting the actual rate of penetration comprises reducing the actual rate of penetration.

6. The method of claim 1, wherein adjusting the actual rate of penetration comprises increasing the actual rate of penetration.

7. The method of claim 1, further comprising displaying, via the visualization tool, a volume of cuttings in the wellbore not removed from the wellbore, a volume of cuttings adhering to sidewalls of the wellbore, or both.

8. The method of claim 1, further comprising displaying, via the visualization tool, opportunities for well bore cleaning optimization when the actual rate of penetration under performs the optimal rate of penetration.

9. The method of claim 1, further comprising displaying, via the visualization tool, notification of suboptimal drilling parameters when the actual rate of penetration is greater than the optimal rate of penetration.

10. A method of performing a drilling operation with a drill bit through a formation, comprising:
    defining settings of drilling parameters for cleaning of a wellbore formed by the drill bit to the maximum extent;
    displaying, on a visualization tool, a graphical indication of the settings of the drilling parameters;
    defining a maximum rate of penetration of the drill bit through the formation based on the settings;
    displaying, on the visualization tool, a graphical layout of the maximum rate of penetration, wherein the graphical layout comprises a boundary depicting the maximum rate of penetration that graphically matches the graphical indication of the settings; and
    displaying, on the visualization tool, an actual boundary that is mapped onto the graphical layout, the actual boundary depicting the actual rate of penetration of the drill bit.

11. The method of claim 10, comprising displaying, via the visualization tool, a volume of cuttings in the wellbore not removed from the wellbore, a volume of cuttings adhering to sidewalls of the wellbore, or both.

12. The method of claim 10, comprising displaying, via the visualization tool, a warning notification when the actual rate of penetration is different than the maximum rate of penetration.

13. The method of claim 10, wherein the drilling parameters comprise at least one of a drilling fluid flow rate, a fluid property, or a rotational speed.

14. The method of claim 10, further comprising adjusting the actual rate of penetration.

15. The method of claim 10, further comprising displaying, via the visualization tool, opportunities for well bore cleaning optimization when the actual rate of penetration underperforms the maximum rate of penetration.

16. The method of claim 10, further comprising displaying, via the visualization tool, notification when the actual rate of penetration is greater than the maximum rate of penetration.

17. The method of claim 10, wherein the actual rate of penetration defines a level of performance for actual wellbore cleaning.

18. The method of claim 10, wherein adjusting the actual rate of penetration comprises increasing the actual rate of penetration.

19. The method of claim 10, wherein adjusting the actual rate of penetration comprises reducing the actual rate of penetration.

* * * * *